United States Patent [19]
Kubo

[11] Patent Number: 5,880,822
[45] Date of Patent: Mar. 9, 1999

[54] LIGHT WAVE DISTANCE MEASURING APPARATUS AND METHOD FOR DETERMINING DISTANCE OF AN OBJECT

[76] Inventor: Akio Kubo, c/o Ushikata Mfg.Co., Ltd. 12-7, 2-chome Chidori, Ota-ku, Tokyo, Japan

[21] Appl. No.: 800,379

[22] Filed: Feb. 14, 1997

[30] Foreign Application Priority Data

Feb. 29, 1996 [JP] Japan .................................. 8-043169

[51] Int. Cl.[6] .................................................. G01C 3/08
[52] U.S. Cl. .......................................... 356/5.1; 356/5.12
[58] Field of Search .................................. 356/5.12, 5.13

[56] References Cited

U.S. PATENT DOCUMENTS

| | | | |
|---|---|---|---|
| 3,619,058 | 11/1971 | Hewlett | 356/5.12 |
| 3,779,645 | 12/1973 | Nakazawa et al. | 356/5.13 |
| 4,636,068 | 1/1987 | Niiho et al. | 356/5.13 |
| 5,241,360 | 8/1993 | Key et al. | 356/5.12 |

*Primary Examiner*—Stephen C. Buczinski
*Attorney, Agent, or Firm*—McGinn & Gibb, P.C.

[57] ABSTRACT

A light wave distance measuring apparatus includes a light-sending optical system and a light-receiving optical system, which are preferably arranged to be parallel to each other. Intensity-modulated light of the light-sending optical system is transformed into parallel rays of light and projected towards a target, reflected back towards the measuring apparatus and detected by the light-receiving optical system in order to calculate the distance of the target from a reference point.

20 Claims, 7 Drawing Sheets

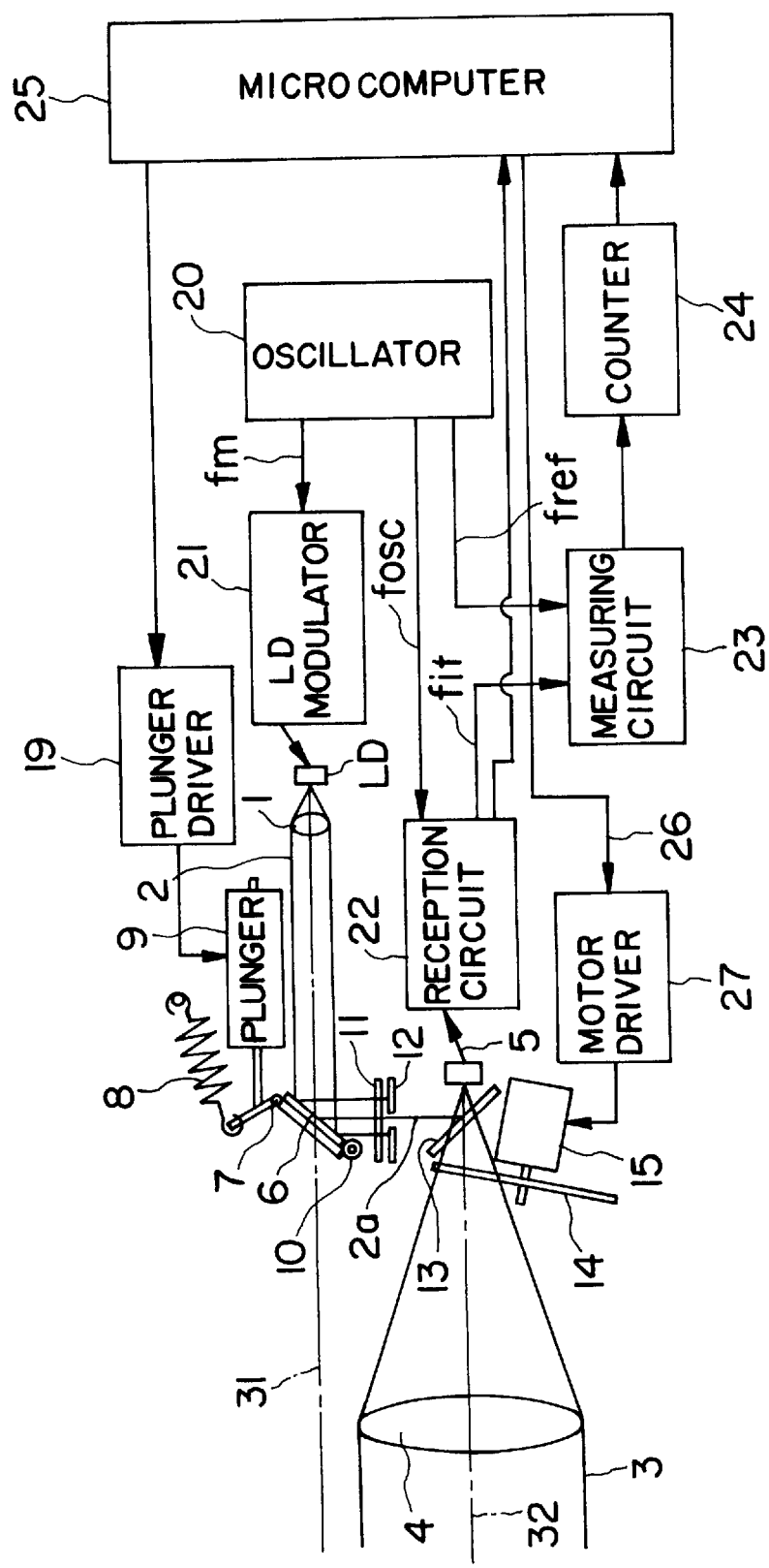
F I G. 2

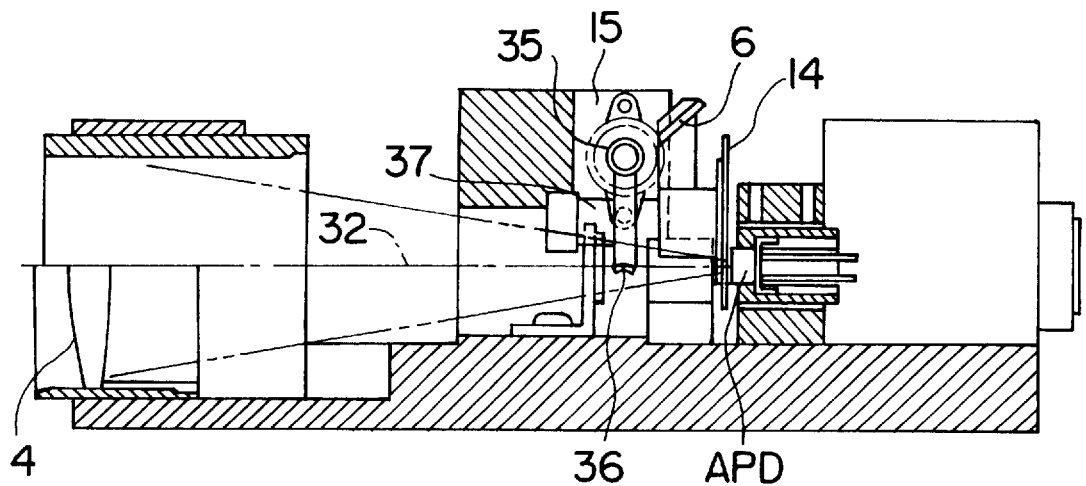
F I G. 4
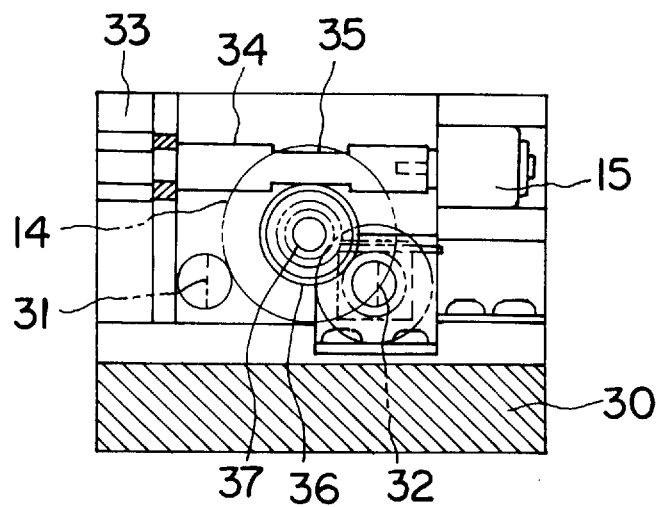
F I G. 5

LIGHT WAVE DISTANCE MEASURING APPARATUS AND METHOD FOR DETERMINING DISTANCE OF AN OBJECT

BACKGROUND OF THE INVENTION

1. Field of the Invention

The present invention relates to a light wave distance measuring apparatus, and method for determining the distance of an object from a reference point. In particular, the present invention is directed to a method and apparatus in which a light wave distance measurement is performed by determining a phase difference between a phase of a receiving signal, obtained by transmitting intensity-modulated light of a light-emitting element having a specific frequency, to a target, reflecting the intensity-modulated light to a light-receiving element, and between internal light of a predetermined phase obtained by "cutting-off" the intensity-modulated light received by the light-receiving element. By this method and apparatus, a distance from a reference point to the target is determined.

2. Description of the Prior Art

A conventional light wave distance measuring device, such as, for example, the light wave distance measuring device shown in FIG. 9, comprises a light-sending optical system 41 and a light-receiving optical system 42. The light-sending optical system comprises a light-sending element 43 that emits a light wave (beam), a condenser lens 45, and an optical fiber 47. The light-receiving optical system 42 comprises a light-receiving element 44, a condenser lens 46, and an optical fiber 48. The optical fiber 47 functions to transmit light emitted by the light-sending element 43. The optical fiber 48 functions to receive light to be directed to the light-receiving element 44.

Light (e.g., a light wave) from the light-sending optical system 41 is transmitted as an internal light to the light-receiving optical system 42 via a relay condenser lens 49 and a reflecting mirror 50. Further, light from the light-sending optical system 41 is additionally transmitted as an external light towards a target (object) via a reflecting prism 51 and an objective lens 52. That is, the external light is transmitted towards the object to which a distance from a reference point is measured.

Light reflected from the target is condensed by the objective lens 52, level-adjusted by a variable ND (neutral density) filter 53 having a density which continuously changes, and forwarded (transmitted) to the light-receiving optical system 42. Thus, a distance from a reference point to the object is determined based upon a phase difference of the internal and external light waves.

However, in the above-mentioned conventional light wave distance measuring device, a transmission circuit of the light-sending optical system 41 and a reception (receiving) circuit of the light-receiving optical system 42 should be separated (kept away) from each other, in order to prevent an occurrence of an electromagnetic wave induction. Thus, optical fibers are necessary. The use of optical fibers with the conventional measuring device increases the cost of the measuring device. Further, the treatment (manipulation) of light in both the light-receiving optical equipment 41 and the light-receiving optical equipment 42, and in particular, an angle adjustment of the internal light is complicated.

In addition, it is not possible to prevent losses in the amount of light that is transmitted, such loss occurring as a result of errors in the adjustment of the optical fibers 47 and 48, the relay condenser lens 49, and the reflecting mirror 50. Thus, the accuracy of a distance measurement using the conventional measuring device is reduced.

SUMMARY OF THE INVENTION

According to the present invention, a light wave distance measuring apparatus is provided in which the above-mentioned imperfections are reduced/eliminated, the treatment of light is simplified, and an optical system measurement can be performed without reducing the accuracy of the distance measurement.

According to the present invention, a light wave distance measuring apparatus is attained in which the distance measurement is made by determining a phase difference between a phase of a receiving signal (e.g., light) obtained by transmitting (sending) an intensity-modulated light to a target. The intensity-modulated light is obtained by modulating light from a light-emitting element with a predetermined (special) frequency. Intensity-modulated light reflected from the target is directed to a light-receiving element. A phase of an internal light, which is generated by interrupting (cutting-off) the intensity-modulated light, is received by the light-receiving element, by which a distance from a reference point to the target is determined.

The light wave distance measuring apparatus includes a light-sending optical system, and a light-receiving optical system, wherein the intensity-modulated light of the light-sending optical system is made of parallel (e.g. collimated) rays of light. The parallel rays of light are sent to the target. A portion of the light is taken out (removed) from the parallel rays of light in the light-sending optical system, and forwarded to the light-receiving optical system, by which a reference distance and a reference level as internal light are determined.

In the present invention, an optical system of the internal light in which the light is taken out of the light-sending optical system preferably comprises a reflecting plate which is rotated at a position between the light-sending optical system and the light-receiving optical system, and an iris that adjusts an amount of light of the internal light.

The cost of producing a light wave distance measuring apparatus according to the present invention is lower than the cost of producing a conventional apparatus, since the present invention dispenses with the use of optical fibers. Further, since the light is taken out of the optical path of the parallel rays of light in the light-sending optical system, it is easier to treat (process) the light. Thus, the construction of the optical system can be simplified without reducing a measurement accuracy, and a low-priced, small-sized and lightweight light wave distance measuring apparatus can be produced.

According to the present invention, a light wave distance measuring apparatus is disclosed in which a distance measurement of an object is obtained by determining a phase difference between a first signal, obtained by emitting intensity-modulated light modulated by a predetermined frequency towards a target and detecting intensity-modulated light reflected from the target to a light-receiving element, and a second signal representing intensity-modulated internal light associated with a reference point, in which the light wave distance measuring apparatus comprises a light-sending optical system, and a light-receiving optical system arranged to be parallel to the light-sending optical system, wherein the intensity-modulated light is transformed into parallel rays of light that are emitted towards the target, a portion of the parallel rays of light being utilized as the second signal to determine a reference distance and a reference level.

According to an advantage of the instant invention, the light-sending optical system comprises a reflecting plate that is selectively positioned between the light-sending optical system and the light-receiving optical system to obtain said internal light, and an iris is provided to adjust an amount of the internal light.

According to the present invention, a method is disclosed for determining the distance of an object from a reference point. According to the method, a first signal representing a reference distance $D_o$ to a reference point is obtained. Then, a second signal representing a distance D to the object is obtained. Thereafter, the distance of the object from the reference point is determined based upon a relationship of the first signal to the second signal.

An advantage of the present method is that the first signal comprises emitting internal light that is detected by a light-receiving optical system, converting the detected internal light to an electrical signal having a first predetermined phase, and comparing the predetermined phase of the electrical signal to a reference phase of a reference signal to obtain the first signal.

Another advantage of the present method resides in that the second signal comprises emitting external light towards the object, so that the external light is reflected back and detected by the light-receiving optical system, and converting the detected external light to the second signal with a second predetermined phase.

According to a feature of the present invention, determining the distance of the object from the reference point based upon the relationship of the first signal and the second signal comprises obtaining a difference value by subtracting the first signal from the second distance, and dividing the obtained difference value by a predetermined value.

According to the present invention, a light wave distance measuring apparatus, comprises a light-sending optical system, a light-receiving optical system that receives external light reflected from the object, and a distance calculating device, such as, for example, a processor, that determines a distance to the object from the reference point based upon a relationship of a phase of the external light reflected from the object and a phase of the reference distance. The light-sending optical system comprises an emitter, such as, for example, a laser, that emits a source of light, an external light generating device that produces external light, from the source of light, the external light being emitted towards an object, and an internal light generating device that produces internal light, from the external light, for obtaining a reference distance to a reference point.

According to a feature of the instant invention, the internal light generating device comprises a blocking device, such as a shutter or diffusion plate, that re-directs at least a portion of the source of light from the emitter towards the light-receiving optical system. If a reflecting plate is employed, the reflecting plate is rotatable about a supporting point, and a driving device, such as, for example, a plunger or motor or other driving mechanism, is provided that selectively rotates at least a portion of the reflecting plate to be within an optical path of the source of light, so as to re-direct the source of light towards the light-receiving optical system. Further, a returning device, such as, for example, a spring, is provided to withdraw the reflecting plate from within the optical path of the light source.

Alternatively, the blocking device comprises a reflecting plate, an arm that supports the reflecting plate at a predetermined angle, and a drive mechanism that drives the arm so as to selectively insert the reflecting plate within an optical path of the source of light, so as to re-direct the source of light towards the light-receiving optical system.

According to still another advantage of the instant invention, the light-receiving optical system comprises a light-receiving element, an objective lens that condenses the external light reflected from the object to impinge the light-receiving element, and a light amount adjusting device that adjusts a level of the condensed external light that impinges the light-receiving element.

In another advantage of the present invention, the light wave distance measuring apparatus also includes a half-mirror that directs the internal light of the light-sending optical system to impinge the light-receiving element.

It is noted that the light-sending optical system and the light-receiving optical system are arranged in the instant invention so as to minimize electrical interference. In this regard, the light-sending optical system is arranged in a vertical direction on one side of an equipment body, with the light-receiving optical system being arranged in a vertical direction on a second side of the equipment body, so as to be parallel to the light-sending optical system.

According to another feature of the invention, the processor subtracts the phase of the reference distance from the phase of the external light reflected from the object, and divides a result by a predetermined value, such as 2.

The present disclosure relates to subject matter contained in Japanese Patent Application HEI 8-043169, filed on Feb. 29, 1996, which is expressly incorporated herein by reference in its entirety.

BRIEF DESCRIPTION OF THE DRAWINGS

The foregoing and other objects, features, and advantages of the invention will be apparent from the following more particular description of a preferred embodiment, as illustrated in the accompanying drawings which are presented as a non-limiting example, in which reference characters refer to the same parts throughout the various views, and wherein:

FIG. 2 is a block diagram of the first embodiment illustrated in FIG. 1;

FIG. 4 is a semi-sectional plan view taken along line IV—IV in FIG. 3;

FIG. 5 is a transverse cross-sectional view taken along line V—V in FIG. 3;

DETAILED DESCRIPTION OF PREFERRED EMBODIMENTS

Figure 1:
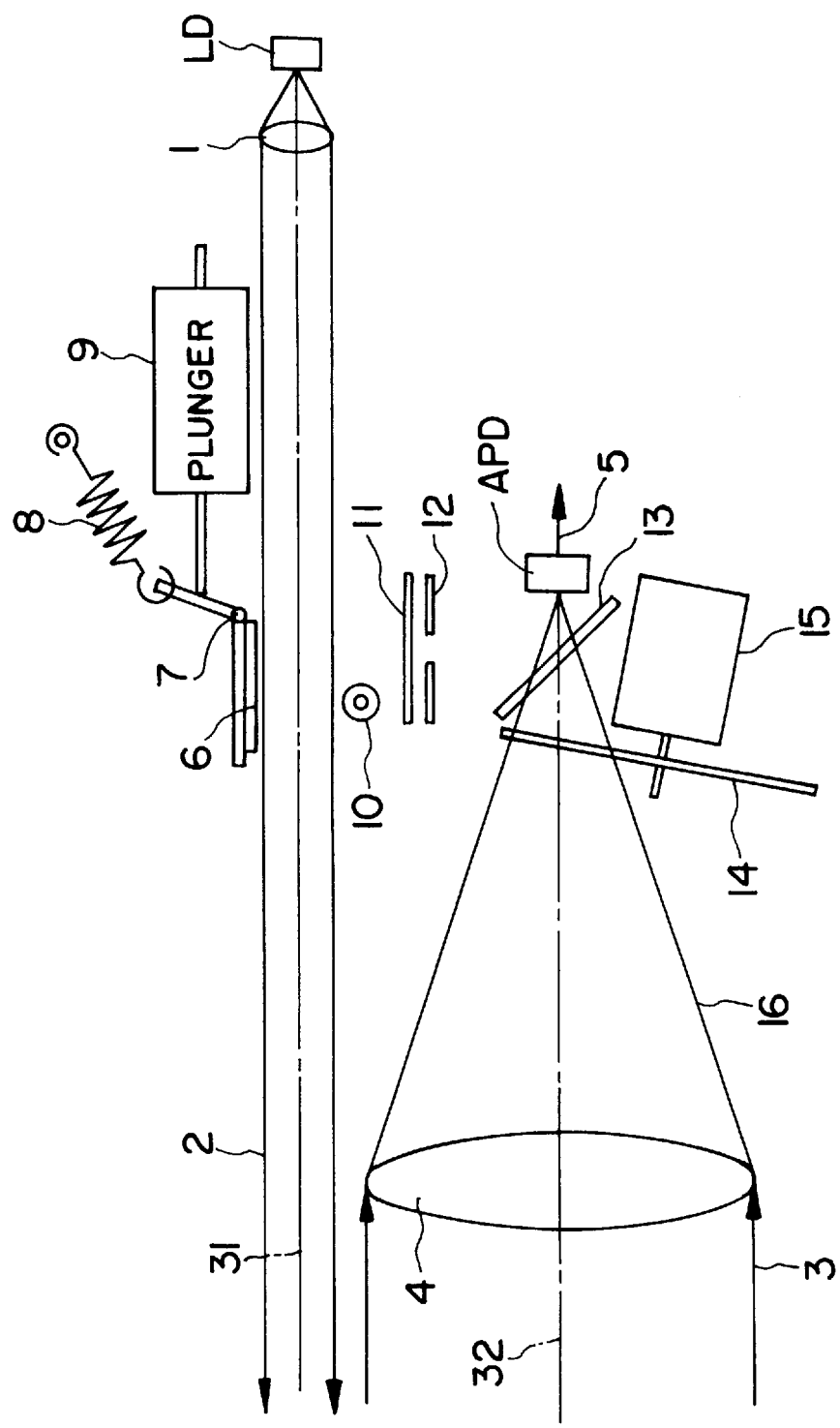
FIG. 1 is a schematic illustration of a first embodiment of the present invention.
Figure 3:
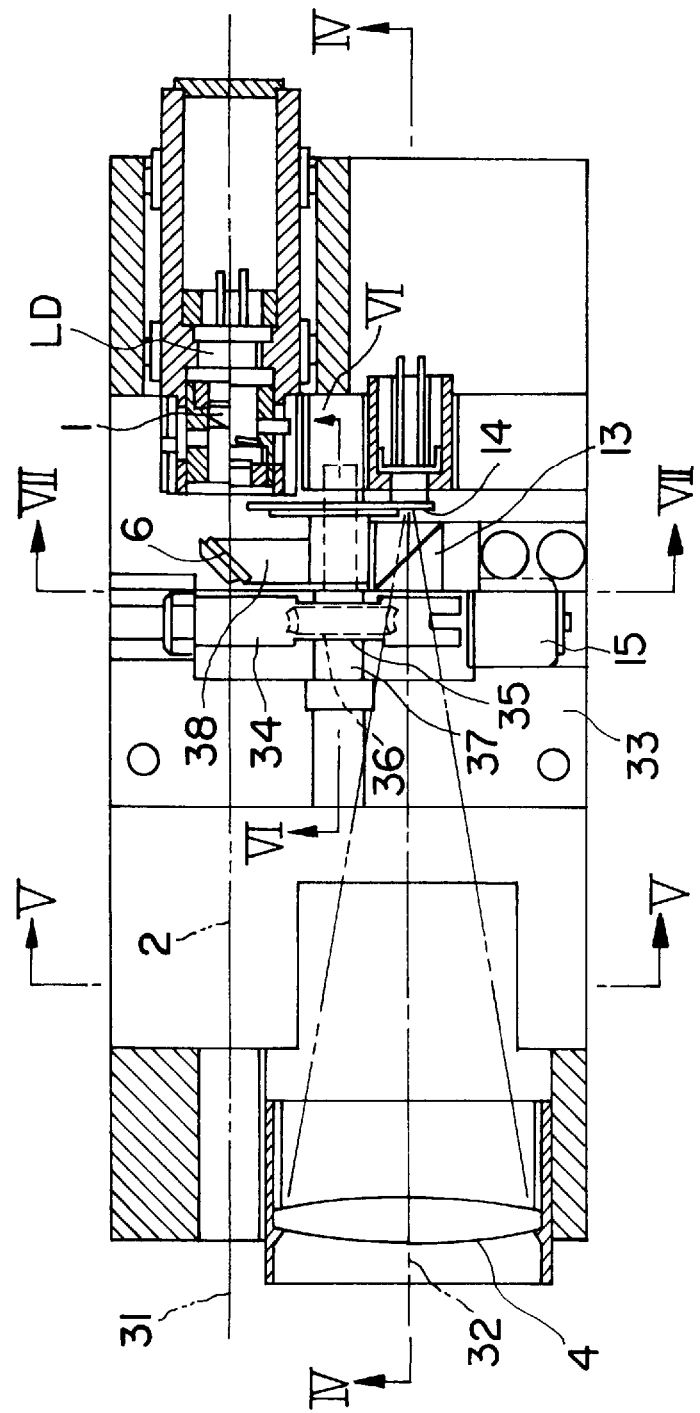
FIG. 3 is a partial sectional schematic plan view of a second embodiment of the present invention.

FIG. 1 is a schematic illustration, and FIG. 2 is a block diagram of a first embodiment of the present invention.

As shown in FIG. 1, a light-sending optical system 31 comprises a laser diode LD that emits light (external light).

In the preferred embodiment, the laser diode comprises a visible light semiconductor laser. However, it is understood that other types of lasers may be employed without departing from the spirit and/or scope of the present invention.

The light emitted by the laser diode LD of the light-sending optical system 31 passes through a first objective lens 1, arranged on a light-emitted side, to form parallel (e.g. collimated) rays of light 2. The parallel rays of light 2 are sent toward a target/object (not shown) for which a distance is to be measured by the external light.

Light reflected from the object (e.g., reflected light 3) is condensed via a second objective lens 4, arranged on a light-received side in a light-receiving optical system 32, to fall on a light-receiving element APD. The light receiving element APD functions to convert the reflected light 3 into an electric signal 5.

According to the preferred embodiment, the diameter of the focal length of the first objective lens is dependent upon the diameter of the laser diode LD. Thus, the focal length of the first objective lens 1 can be decreased when a laser diode that emits a small diameter laser light is employed, as compared to using a laser diode that emits a large diameter laser light. Further, in the preferred embodiment, the diameter of the second objective lens 4 is larger than the diameter of first objective lens 1. However, it is understood that variations with respect to the diameter and focal lengths of the objective lenses 1 and 4 and diameter of light emitted by the laser diode LD may occur without departing from the scope and/or spirit of the present invention.

In the preferred embodiment, the light-sending optical system 31 and the light-receiving optical system 32 are arranged in parallel with each other. Further, the light-sending optical system 31 is disposed backward (rearward) of the light-receiving optical device 32 in order to minimize electrical (radio) interference produced by electrical circuits (electronics) associated with both the light sending optical system 31 and the light-receiving optical system 32 can be prevented.

A reflecting plate 6, that functions as a shutter, is provided at one side of an optical path of the parallel rays of light 2 in the light-sending optical system 31. The reflecting plate 6 is rotatable about a supporting point 7 and is mounted so as to be selectively rotatable within the optical path of the parallel rays of light 2, so as to selectively block (take out) an internal light 2a (FIG. 2). In the preferred embodiment, the reflecting plate 6 is spring-loaded outward of the optical path by a returning device, such as, for example, a spring 8, and is rotated to be placed within the optical path by a driving device, such as, for example, a plunger 9. It is understood that other types of devices that block (re-direct) the internal light 2a, such as, for example, a diffusion plate, and/or construction techniques to selectively block the internal light 2a may be used without departing from the spirit and/or scope of the present invention.

In FIGS. 1 and 2, element 10 designates a stopper that functions to stop the rotation of the reflecting plate 6. In the preferred embodiment, the stopper 10 is positioned so that the reflecting plate 6 is positioned at an angle of approximately 45° with respect to the optical path of the parallel rays of light 2 when the reflecting plate is positioned to interrupt (block) the internal light 2a.

An ND (neutral density) filter 11 and an iris 12 are provided in opposition to the reflecting plate 6, in which the above-mentioned internal light 2a can be adjusted to a reference amount of light.

In order to introduce the internal light 2a, a half-mirror 13, having a transitivity of 90% (in the preferred embodiment), is provided within optical path 16 of the reflected rays of light 3, at a point opposed to the ND filter 11 and iris 12. Further, a light amount adjusting device, such as, for example, a filter 14, is provided for adjusting and reducing the amount of received light. The filter 14 is provided within the optical path 16 of the reflected rays 3. The filter 14 is rotated by, for example, a motor 15, so as to be able to adjust and reduce the amount of light. In the preferred embodiment, the filter 14, which functions to adjust and reduce the amount of received light, comprises a variable ND (neutral density) filter 14 in which a density thereof continuously changes. However, it is understood that alternative means for adjusting and reducing the amount of light may be used without departing from the scope and/or spirit of the present invention. Further, the half-mirror 13 may have a transitivity other than 90%.

The operation of a light wave distance measuring equipment of the present invention will be explained with reference to FIG. 2. A laser diode (LD) modulator 21 modulates the intensity of a light source produced by a light-emitted laser diode LD. An oscillating circuit 20 having a predetermined frequency $f_m$ is connected to the LD modulator 21 so as to modulate the light source at the predetermined frequency $f_m$. The construction of an oscillating circuit 20 is known to those skilled in the art, and thus, is not described in detail herein.

When a reference distance $D_o$ is to be measured, a processor, such as, for example, a microcomputer 25, controls a plunger driver 19 to operate the plunger 9. The reflecting plate 6 is rotated into the optical path of the parallel rays of light 2, so that all of the parallel rays of light 2 are reflected at a substantially right angle (relative to the parallel rays of light 2) and sent (transmitted) as internal light 2a through the ND filter 11 and iris 12 to the half-mirror 13. The internal light 2a is reflected at a substantially right angle (relative to the internal light 2a) towards the light-receiving element APD, which converts the light into the electric signal 5.

The amount of incident light is adjusted to the reference amount of light through the ND filter 11 and iris 12. The reference amount of light is determined according to a ratio of the amount of light of a signal to the amount of light of noise, which determines the accuracy of the measured distance.

The electric signal 5 is provided to the microcomputer 25 via a reception circuit 22. A reference level $L_o$ of internal light 2a is measured, while the electric signal 5 is transmitted to the reception circuit 22. In the reception circuit, the electric signal 5 is converted into an intermediate frequency $f_{if}$ by a frequency $f_{osc}$, which is obtained by dividing the predetermined frequency $f_m$ (produced by the oscillating circuit 20) by an integer N. The intermediate frequency $f_{if}$ is inputted to a phase difference measuring circuit 23. The phase difference measuring circuit 23 compares the intermediate frequency $f_{if}$ with a frequency $f_{ref}$ having the same frequency as the frequency $f_{osc}$. The detected phase difference is inputted to a counter 24, at which a phase difference between the value of the reference phase difference and the value of the phase difference of the internal light 2a is calculated. The calculated result is inputted to the microcomputer 25 to obtain the reference distance $D_o$.

Thereafter, a distance D to an object is measured. First, the plunger 9 is deactivated so that the reflecting plate 6 is revolved to be outside of the optical path of the parallel rays of light 2. Thus, the parallel rays of light 2 (hereinafter referred to as external light) are sent to an object (not shown)

for which a distance is to be measured. The reflected light 3 reflected from the object is condensed onto the light-receiving element APD via the second objective lens 4. An electric signal 5 outputted from the light-receiving element APD is sent to the microcomputer 25 in the same manner described above with respect to the determination of the reference distance $D_o$.

A level L of the electric signal 5 is compared with a reference level $L_o$ of the electric signal 5 obtained when the above-mentioned reference distance $D_o$ is measured. In response to this comparison, the microcomputer 25 outputs pulse signals 26 to a motor driver 27. The motor driver 27 controls the rotation of the motor 15, which rotates the variable ND filter 14. The motor 15 is controlled by the motor driver 27 to rotate the variable ND filter 14 until the deviation of electric signal 5 (difference between the level L and the reference level $L_o$) becomes zero. Thereafter, a measurement of the distance D is made in a manner similar to that discussed with respect to the determination of the reference distance D by the internal light 2*a*. In this way, an actual distance of the object can be obtained by dividing $D-D_o$ (D minus $D_o$) by a predetermined value, which in the preferred embodiment is 2. It is noted that an error in the phase of the signal, which occurs due to temperature variations and which changes according to the amount of light of the signal and the electronic circuits, can be compensated.

In the first embodiment of the present invention, light is taken out of the parallel rays of light 2 in the light-sending optical system 31, and transmitted to the light-receiving optical system 32. The distance between the laser diode LD of the light-sending optical system 31 and the light-receiving element APD of the light-receiving optical system 32 can be set freely, but is preferably arranged so as to minimize the generation of extraneous (e.g., noise) radio waves.

Further, the present invention dispenses with the optical fibers 47 and 48, the relay condenser lens 49, and the reflecting mirror 50 employed in the conventional light wave distance measuring device, thus reducing the cost of production.

FIGS. 3, 4, 5, 6 and 7 illustrate a second embodiment of the present invention. Elements that are common to the first embodiment are denoted in the second embodiment with the same reference designations.

In the second embodiment of the present invention, a light-sending optical system 31 is arranged in a vertical direction on one side of an equipment body 30. A light-receiving optical system 32 is arranged in the vertical direction on an other (e.g., second) side of the equipment body 30. The light-sending optical system 31 and the light-receiving optical system are arranged to be parallel to each other.

Figure 6:
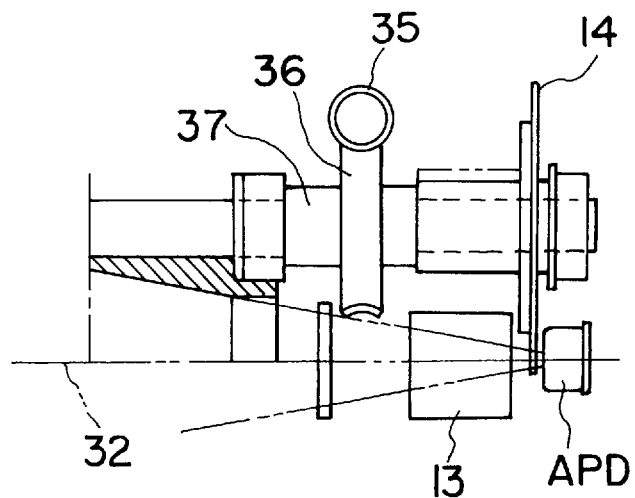
FIG. 6 is an enlarged vertical sectional view along line VI—VI in FIG. 3.

As illustrated in FIGS. 5 and 6, a shaft 34 of a driving mechanism, such as, for example, a motor 15, is mounted in a transverse direction at an upper portion of a strut 33. The strut 33 is arranged on both sides of the equipment body 30 in a central area of the equipment body 30. A worm gear 35, which is formed at a central area of a shaft 34, engages with a worm gear 36 that is vertically positioned, in which shaft 37 of the worm wheel 36 is positioned in a vertical direction at a location between the light-sending optical system 31 and the light-receiving optical system 32.

Figure 7:
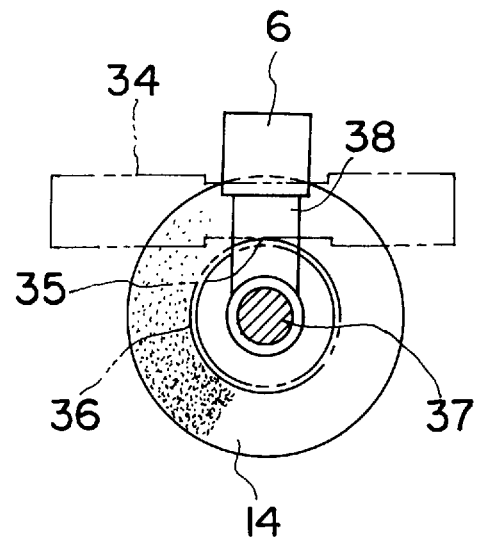
FIG. 7 is a sectional view taken along line VII—VII in FIG. 3.

Arm 38 is provided to support the reflecting plate 6 at an inclination angle of approximately 45°. Filter 14 is secured on the shaft 37. As shown in FIG. 7, a circumferential position of the reflecting plate 6 is positioned beyond a predetermined (e.g., deep) area of the variable ND filter 14.

In the second embodiment, the supporting point 7, the spring 8, and the plunger 9, which were employed in the first embodiment, are unnecessary.

Figure 8:
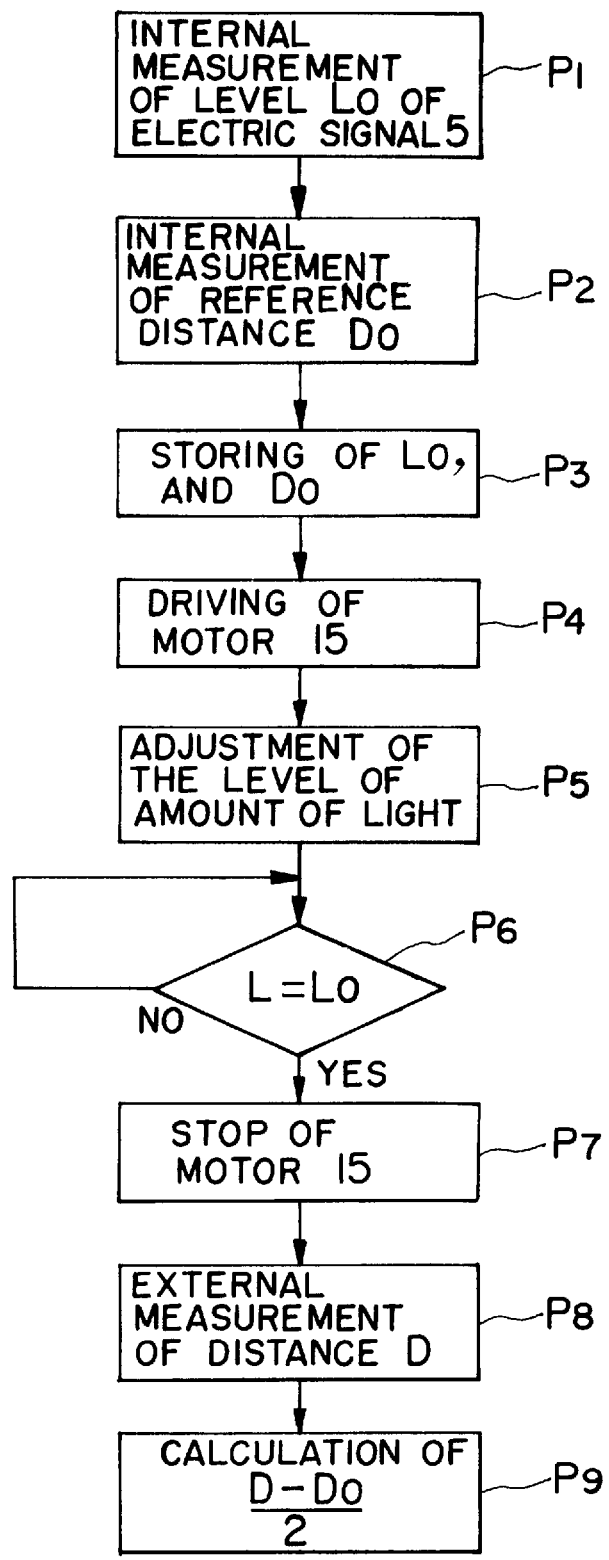
FIG. 8 is a flow diagram illustrating operations performed by a light wave distance measuring apparatus of the present invention.
Figure 9:
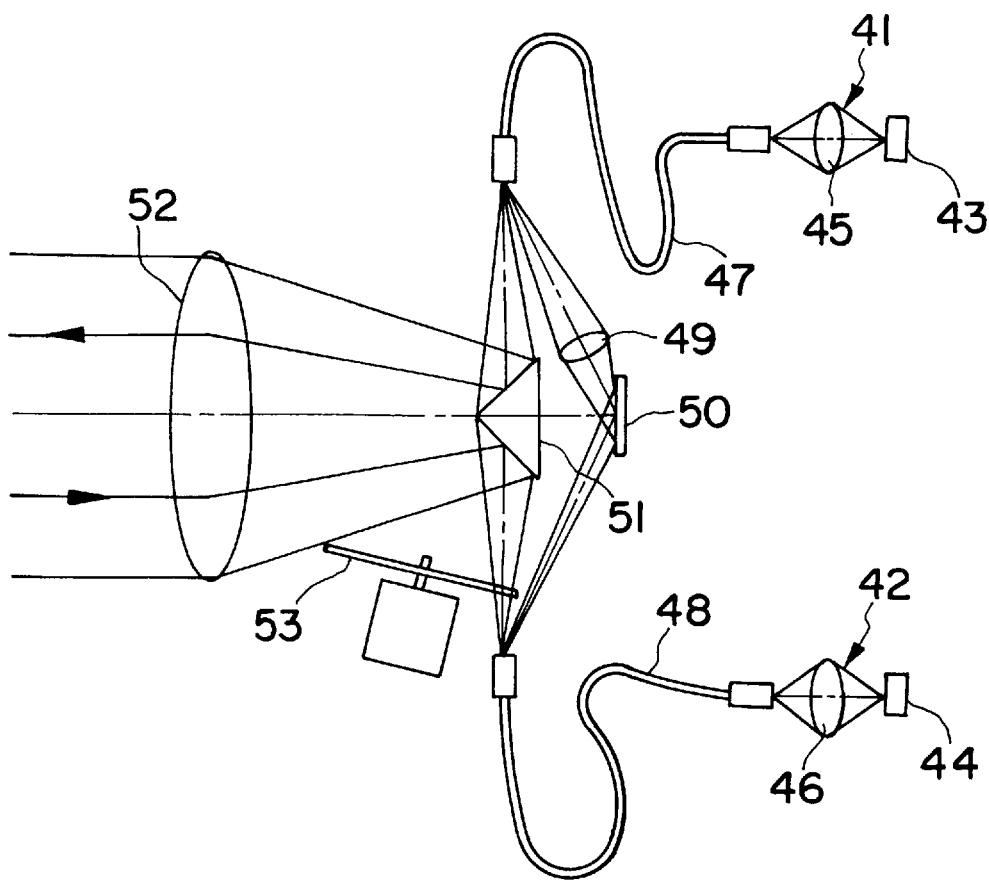
FIG. 9 is a schematic illustration of a conventional apparatus.

The operation of the light wave distance measuring apparatus according to the preferred embodiments will now be explained with reference to the flow chart of FIG. 8. Initially, the reflecting plate 6 is positioned within the optical path of the parallel rays of light 2. At step $P_1$, an internal measurement level $L_o$ of the electric signal 5 is obtained by only the internal light 2*a* of the light-sending optical system 31. At step $P_2$, the internal measurement of the reference distance $D_o$ is made using only the internal light 2*a* of the light-sending optical system 31. Then, at step $P_3$, the reference level $L_o$ and the reference distance $D_o$ are stored.

At step $P_4$, the motor 15 is operated to rotate. The reflecting plate 6 is withdrawn (taken out) from the optical path of the parallel rays of light 2, so that the apparatus is switched from obtaining the internal measurement to obtaining an external measurement using the external light emitted by the light-sending optical system 31 and detected by the light-receiving optical system 32.

At step $P_5$, the amount (level) of light L emitted by the light-sending optical system 31 is adjusted by the filter 14. Then, at step $P_5$, the level of amount of light L is compared with the reference level $L_o$. When the two values are equal (e.g., $L=L_o$), processing proceeds to step $P_7$, so that the rotation of the motor 15 is stopped. Thereafter, the external distance D is obtained at step $P_8$.

Lastly, the distance from the reference point to the object is calculated by subtracting the reference distance $D_o$ from the obtained external distance D and dividing the result by 2 (e.g., $[D-D_o]/2$) at step $P_3$.

Although the present invention has been described with reference to particular means, materials and embodiments, it is to be understood that the invention is not limited to the particulars disclosed and extends to all equivalents within the scope of the claims.

What is claimed:

1. A light wave distance measuring apparatus in which a distance measurement of an object is obtained by determining a phase difference between a first signal, obtained by emitting intensity-modulated light modulated by a predetermined frequency towards a target and detecting intensity-modulated light reflected from the target to a light-receiving element, and a second signal representing intensity-modulated internal light associated with a reference point, the light wave distance measuring apparatus comprising:

a light-sending optical system; and a light-receiving optical system arranged to be parallel to said light-sending optical system, wherein said intensity-modulated light is transformed into collimated rays of light that are emitted towards the target, a portion of said collimated rays of light being utilized as said second signal to determine a reference distance and a reference level, wherein said second signal comprises an internal light, and wherein said light-sending optical system comprises:

a reflecting plate selectively positioned between said light-sending optical system and said light-receiving optical system to obtain said internal light; and an iris that adjusts an amount of said internal light, wherein one of the light-sending optical system and the light-receiving optical system is disposed rearwardly of the other of the light-sending optical system and the light-receiving optical system.

2. A method for determining the distance of an object from a reference point, comprising:

providing a light-sending optical system and a light-receiving optical system arranged to be parallel to said light-sending optical system;

obtaining a first signal representing a reference distance $D_o$ to a reference point, by said light-receiving optical system detecting internal light removed from a portion of collimated rays emitted by said light-sending optical system;

obtaining a second signal representing a distance D to the object; and determining the distance of the object from the reference point based upon a relationship of the first signal to the second signal, wherein one of the light-sending optical system and the light-receiving optical system is disposed rearwardly of the other of the light-sending optical system and the light-receiving optical system.

3. The method of claim 2, wherein the step of obtaining the first signal further comprises:

converting the detected internal light to an electrical signal having a first predetermined phase; and comparing the predetermined phase of the electrical signal to a reference phase of a reference signal to obtain the first signal.

4. The method of claim 3, wherein the step of obtaining the second signal comprises:

emitting external light towards the object, the external light being reflected and detected by the light-receiving optical system; and converting the detected external light to the second signal with a second predetermined phase.

5. The method of claim 4, wherein determining the distance of the object from the reference point based upon the relationship of the first signal and the second signal comprises:

obtaining a difference value by subtracting the first signal from the second signal; and dividing the obtained difference value by a predetermined value.

6. A light wave distance measuring apparatus, comprising:

a light-sending optical system, comprising:
an emitter that emits a source of light;
an external light generating device that produces external light, from said source of light, said external light being emitted towards an object and comprising collimated rays of light; and
an internal light generating device that produces internal light, from a portion of said collimated rays of light of said external light, for obtaining a reference distance to a reference point;

a light-receiving optical system that receives external light reflected from the object; and a distance calculating device that determines a distance to the object from said reference point based upon a relationship of a phase of said external light reflected from the object and a phase of light representing said reference distance, wherein one of the light-sending optical system and the light-receiving optical system is disposed rearwardly of the other of the light-sending optical system and the light-receiving optical system.

7. The light wave distance measuring apparatus of claim 6, wherein said internal light generating device comprises:

a blocking device that re-directs at least a portion of said source of light from said emitter towards said light-receiving optical system.

8. The light wave distance measuring apparatus of claim 7, wherein said blocking device comprises a shutter.

9. The light wave distance measuring apparatus of claim 7, wherein said blocking device comprises a diffusion plate.

10. The light wave distance measuring apparatus of claim 7, wherein said blocking device comprises:

a reflecting plate that is rotatable about a supporting point;

a driving device that selectively rotates at least a portion of said reflecting plate to be within an optical path of said source of light, so as to re-direct said source of light towards said light-receiving optical system; and a returning device that operates to withdraw said reflecting plate from within said optical path of said source of light.

11. The light wave distance measuring apparatus of claim 10, wherein said driving device comprises a plunger.

12. The light wave distance measuring apparatus of claim 10, wherein said returning device comprises a spring.

13. The light wave distance measuring apparatus of claim 6, wherein said emitter comprises a laser.

14. The light wave distance measuring apparatus of claim 6, wherein said light-receiving optical system comprises:

a light-receiving element;

an objective lens that condenses said external light reflected from the object to impinge said light-receiving element; and a light amount adjusting device that adjusts a level of said condensed external light that impinges said light-receiving element.

15. The light wave distance measuring apparatus of claim 14, further comprising:

a half-mirror that directs said internal light of said light-sending optical system to impinge said light-receiving element.

16. The light wave distance measuring apparatus of claim 6, wherein said light-sending optical system and said light-receiving optical system are arranged so as to minimize electrical interference.

17. The light wave distance measuring apparatus of claim 6, wherein said distance calculating device comprises a processor.

18. The light wave distance measuring apparatus of claim 16, wherein said processor subtracts said phase of said light representing said reference distance from said phase of said external light reflected from the object, and divides a result by a predetermined value.

19. The light wave distance measuring apparatus of claim 6, wherein said light-sending optical system is arranged in a vertical direction on one side of an equipment body, said light-receiving optical system being arranged in a vertical direction on a second side of said equipment body so as to be parallel to said light-sending optical system.

20. The light wave distance measuring apparatus of claim 7, wherein said blocking device comprises:

a reflecting plate;

an arm that supports said reflecting plate at a predetermined angle; and a drive mechanism that drives said arm so as to selectively insert said reflecting plate within an optical path of said source of light, so as to re-direct said source of light towards said light-receiving optical system.

* * * * *